United States Patent [19]
Thomas

[11] 3,970,805
[45] July 20, 1976

[54] ACTIVE HYBRID CIRCUIT

[75] Inventor: Robert M. Thomas, Maitland, Canada

[73] Assignee: GTE Automatic Electric (Canada) Limited, Brockville, Canada

[22] Filed: Feb. 22, 1974

[21] Appl. No.: 444,889

[52] U.S. Cl. .................................. 179/170 NC
[51] Int. Cl.² .................................. H04B 1/58
[58] Field of Search ................. 179/170 R, 170 NC

[56] References Cited
UNITED STATES PATENTS

| | | | |
|---|---|---|---|
| 2,945,920 | 7/1960 | Vlasak | 179/170 NC |
| 3,453,395 | 7/1969 | Englund, Jr. | 179/170 NC |
| 3,530,260 | 9/1970 | Gaunt, Jr. | 179/170 NC |
| 3,700,831 | 10/1972 | Aagaard et al. | 179/170 NC |
| 3,855,430 | 12/1974 | Colardelle et al. | 179/170 NC |

*Primary Examiner*—Kathleen H. Claffy
*Assistant Examiner*—Randall P. Myers
*Attorney, Agent, or Firm*—David M. Keay; Robert T. Orner; Theodore C. Jay, Jr.

[57] ABSTRACT

An active hybrid circuit for providing isolation between a signal receiving line and a signal transmitting line coupled to a two-wire telephone subset. The receiving line is coupled to a receiving amplifier having a differential output coupled to a pair of common terminals. The telephone subset is also connected to the two common terminals. The two common terminals are connected to the two inputs of a transmitting operational amplifier. The transmitting signal line is coupled to the output of the transmitting amplifier. A compensating network is connected between the input to the receiving amplifier and one of the inputs to the transmitting amplifier. The reflected signal produced at the output of the transmitting amplifier due to a received signal at the input to the receiving amplifier passing through the receiving amplifier and then through the transmitting amplifier is cancelled by an equal and opposite compensating signal occurring at the output of the transmitting amplifier by virtue of the received signal passing through the compensating network and the transmitting amplifier.

5 Claims, 2 Drawing Figures

FIG. 1

ACTIVE HYBRID CIRCUIT

BACKGROUND OF THE INVENTION

This invention relates to hybrid circuits for providing isolation between transmitting and receiving lines connected to transmitting-receiving devices. More particularly, it is concerned with active hybrid circuits for coupling between a two-wire transmitting and receiving device, such as a telephone subset, and transmitting and receiving lines.

In certain communications systems, such as conventional telephone systems, two-wire transmitting-receiving devices are employed. These devices are two terminal devices which both transmit and receive signals. In order to prevent received signals from being re-transmitted with transmitted signals an isolating arrangement is necessary. Networks of passive circuit components designated as hybrid circuits are widely employed for this purpose and are well-known in the communication art. Hybrid circuits typically employ transformers together with capacitors of fairly large value. In addition, for certain applications signal gain is needed to make up for various transmission losses; and, therefore, amplifier circuitry is also required.

SUMMARY OF THE INVENTION

An improved active hybrid circuit in accordance with the present invention comprises an input terminal for receiving input signals and a receiving amplifier means having an input connection coupled to the input terminal and having two output connections for producing therebetween a differential output of the signals applied at the input connection. Two common terminals are provided for connecting to a transmitting and receiving unit, for example, a telephone subset. The output connections of the receiving amplifier means are coupled to the common terminals whereby input signals received at the input terminal and amplified to produce a differential output by the receiving amplifier means are applied to the transmitting and receiving unit by way of the two common terminals.

The circuit includes a transmitting amplifier means having two input connections for receiving a differential input and having an output connection. The input connections of the transmitting amplifier means are coupled to the two common terminals, whereby signals being transmitted by the transmitting and receiving unit are applied to the transmitting amplifier means by way of the two common terminals and amplified transmitted signals are produced at the output connection of the transmitting amplifier means.

Active hybrid circuits in accordance with the present invention also include a compensating means which is coupled to the input terminal and to a first of the input connections of the transmitting amplifier means. The compensating means operates in response to a signal at the input terminal to produce a signal at the first input connection of the transmitting amplifier means which causes the transmitting amplifier means to produce at its output connection a signal which is substantially equal to and opposite to the signal produced at its output connection in response to the same input signal amplified by the receiving amplifier means, coupled to the transmitting amplifier means. Thus, substantially none of the signal received at the input terminal appears at the output connection of the transmitting amplifier means and isolation is obtained between the transmitting and receiving lines.

An active hybrid circuit in accordance with the present invention is included in PCM encoder-decoder apparatus which is described and claimed in patent application S.N. 444,891, now U.S. Patent No. 3,877,028, filed concurrently herewith by Robert M. Thomas entitled "PCM Encoder-Decoder Apparatus."

BRIEF DESCRIPTION OF THE DRAWINGS

Additional objects, features, and advantages of active hybrid circuits in accordance with the present invention will be apparent from the following detailed discussion together with the accompanying drawings wherein.

DETAILED DESCRIPTION OF THE INVENTION

Figure 1:
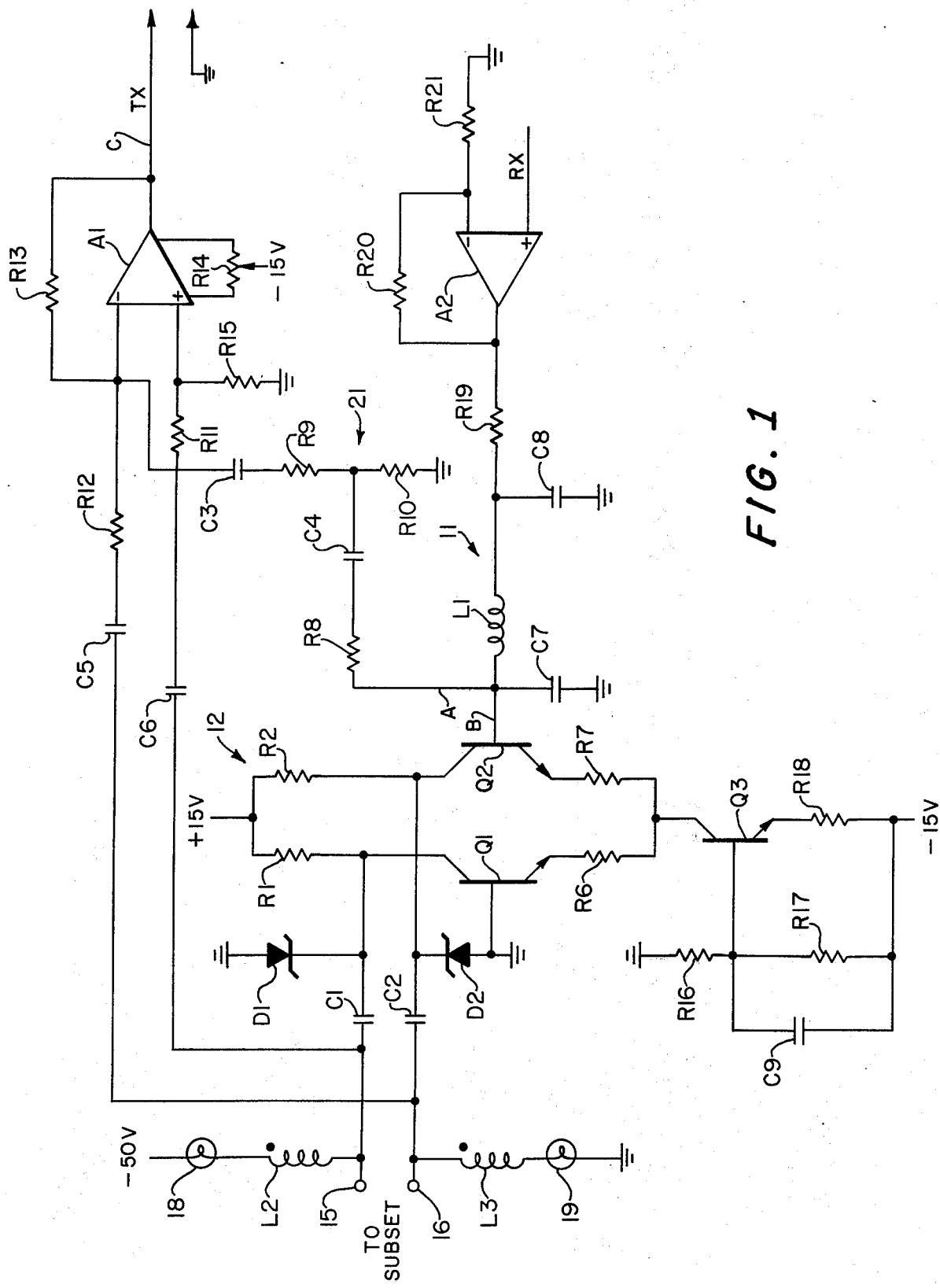
FIG. 1 is a circuit diagram of a specific embodiment of an active hybrid circuit in accordance with the present invention.

The active hybrid circuit in accordance with the invention as illustrated in FIG. 1 is a specific embodiment included in the PCM encoder-decoder apparatus described in the aforementioned application. The circuit includes an operational amplifier A2 having two input connections, a non-inverting or + input and an inverting or − input. An input signal line labeled RX is connected to the + input. As explained in the aforementioned application, the signals on the RX line are voltage pulses at a frequency of 8 KHz. The − input is connected to ground through a resistance R21. A resistance R20 is connected between the − input and the output of the amplifier. The output of the operational amplifier A2 is coupled to a low-pass filter 11 by a resistance R19. The low-pass filter 11 includes a series inductance L1 and capacitors C8 and C7 connected to ground on either side of the inductance.

The output of the low-pass filter 11, which is a smooth, continuous audio signal, is applied to a receiving differential amplifier 12 of two NPN transistors Q1 and Q2 having their emitters connected through resistances R6 and R7, respectively, to the collector of an NPN transistor Q3. Transistor Q3 together with capacitor C9 and resistances R16, R17, and R18 and the connection to a −15 volt power supply as shown provide a constant current source for the differential amplifier transistors Q1 and Q2. The base of transistor Q1 is connected directly to ground and the base of transistor Q2 is connected directly to the output of the low-pass filter 11. The collectors of transistors Q1 and Q2 are connected through resistances R1 and R2, respectively, to a +15 volt power supply. The collectors of transistors Q1 and Q2 are connected by way of capacitors C1 and C2 to terminals 15 and 16, respectively. Terminals 15 and 16 are connected to a two-wire transmit-receive unit, such as a conventional telephone subset. Resistances R1 and R2 are selected to provide a suitable termination for matching the impedance of the subset.

A transmitting amplifier A1 which also operates as a differential amplifier is coupled to the terminals 15 and 16. The transmitting amplifier A1 is an operational amplifier having a non-inverting or + input connection which is connected to terminal 15 by way of a capacitor C6 and a resistance R11. The + input connection is also connected to ground through a resistance R15. The inverting or − input connection of the amplifier A1 is connected through a capacitance C5 and a resistance R12 to terminal 16. A resistance R13 is connected between the output of amplifier A1 and the − input connection. Line TX is connected to the output connection of the amplifier A1.

A battery feed arrangement of inductances L2 and L3 and lamps 18 and 19 are connected to terminals 15 and 16 and to a suitable power supply to provide a conventional DC battery feed arrangement for the subset. Zener diodes D1 and D2 are connected between the lines from the collectors of transistors Q1 and Q2 and ground. These diodes are normally nonconductive and take no part in the operation of the circuit. They protect the system from electrical surges or transients.

The circuit as shown also includes a compensating network 21 which is connected from the base of transistor Q2, the input to the receiving amplifier 12, to the − input of the transmitting amplifier A1. The compensating network includes a resistance R8, a capacitor C4, a resistance R9, and a capacitor C3 connected in series. A resistance R10 is connected to the juncture of capacitor C4 and resistance R9 and to ground.

As stated previously, and as explained in detail in the aforementioned application, the input signals to the circuit over the RX line are voltage pulses. Operational amplifier A2 operates as a high impedance unity gain amplifier and its output is applied to the low-pass filter 11 which converts the pulses to a smooth, continuous audio signal. Thus, it may be considered that the input terminal to the hybrid circuit itself is at the output of the low-pass filter 11 or the input to the receiving amplifier 12 at the base of transistor Q2.

The receiving amplifier 12 amplifies the signal at its input and produces a differential output between the collectors of the two transistors Q1 and Q2. The output is coupled by way of capacitors C1 and C2 to the terminals 15 and 16 by which it is applied to the telephone subset.

An audio signal being transmitted by the subset also appears across the terminals 15 and 16 and is coupled to the input connections of the transmitting amplifier A1 by way of capacitors C5 and C6. Since the input to the operational amplifier A1 is a differential input, the amplifier rejects common mode signals. The amplified output of the signal appears at the output of amplifier A1 on line TX.

As can be seen from FIG. 1, a received signal at point B, the input to the receiving amplifier 12, is amplified by receiving amplifier 12 and is coupled to the subset by way of terminals 15 and 16. This same signal is also conducted from the terminals 15 and 16 to the transmitting amplifier A1. This signal would appear on line TX and be re-transmitted except for the operation of the compensating network 21. The compensating network 21 produces a cancelling signal such that the signal produced at point C, the output of the transmitting amplifier A1, due to the received signal appearing at point B passing through both amplifiers 12 and A1 is cancelled by an equal and opposite signal occurring at point C by virtue of the received signal at point B passing through the compensating network 21 and the amplifier A1.

Figure 2:
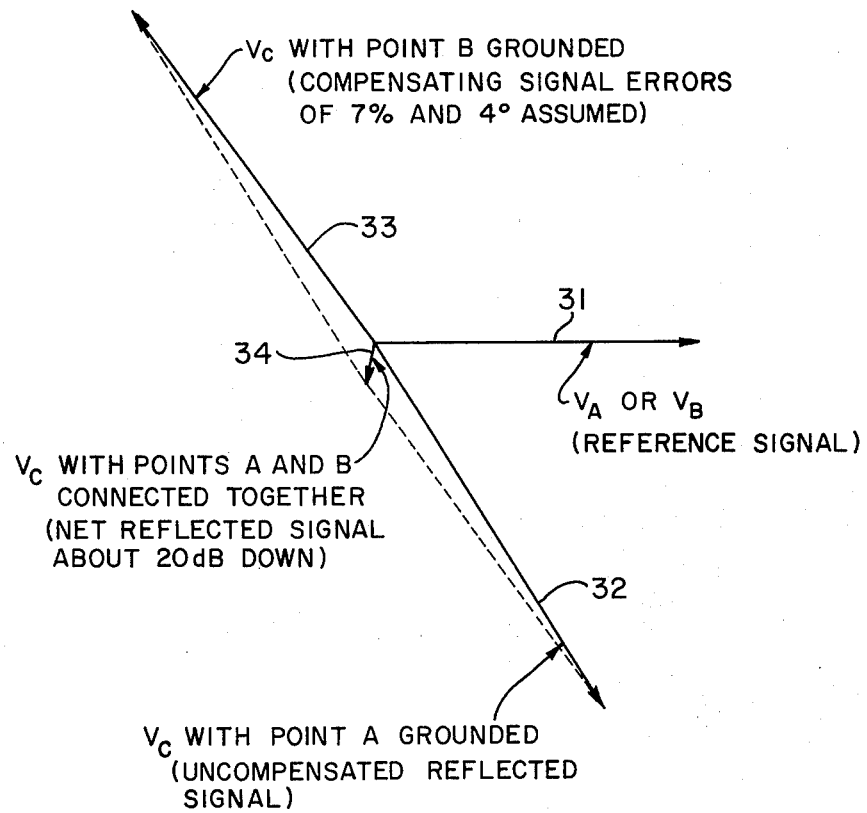
FIG. 2 is a vector diagram useful in explaining the operation of the active hybrid circuit of FIG. 1.

FIG. 2 is a vector diagram useful in understanding the operation of the compensating network 21. A reference voltage 31 is assumed to be present at points A and B. If the circuit is broken at point A and grounded, or the compensating network 21 removed, the resulting voltage at point C is the vector 32. If the circuit is broken at point B and the input to amplifier 12 grounded, the resulting voltage at point C is the vector 33. For purposes of illustration the voltage vector 33 is not shown as exactly equal and opposite to voltage vector 32. Errors of 7% in magnitude and 4° in phase are assumed. The resultant at point C with points A and B properly connected is the voltage vector 34. With the errors assumed, the net reflected signal 34 is about 20 db down from what would be the uncompensated signal 32. This is a worst case condition.

Employing known circuit analysis techniques it is possible to predict accurately the transfer function of the circuit from point B to point C. With this information it is possible to design a compensating network such that the transfer function from point A to point C is substantially equal in magnitude and opposite in phase to that from point B to point C. The compensating network may be considered an impedance scale model of the path from point B through the receiving amplifier 12 to the transmitting amplifier A1. With resistance R9 fixed, resistances R8 and R10 are an impedance model of the combination of the receiving amplifier 12 and the subset in the mid gain region. Capacitor C4 is a model of capacitors C1 and C2, and capacitor C3 is a model of capacitor C5. Thus, a net reflected signal 34 which is at least 20 db down from the uncompensated reflected signal 32 can be obtained over the range from 200 to 3,500 Hz, the usual range of interest for audio signals in telephone systems. This amount of compensation provides effective isolation between the transmitting line TX and the receiving line RX.

One specific embodiment of an active hybrid circuit in accordance with the invention is as shown in FIG. 1 and includes the following components:

| A1 | Operational amplifier Type 747 | R21 | 100 KΩ |
|---|---|---|---|
|  |  | C1 | 1 μf |
| A2 | Operational amplifier Type 747 | C2 | 1 μf |
| Q1 |  | C3 | .02 μf |
| Q2 | Transistors in an RCA Type CA2183 Bipolar Array | C4 | .025 μf |
| Q3 |  | C5 | .02 μf |
| D1 | 16 volt Zener Diode | C6 | .02 μf |
| D2 | 16 volt Zener Diode | C7 | .068 μf |
| R1 | 301 Ω | C8 | .047 μf |
| R2 | 301 Ω | C9 | 1 μf |
| R6 | 301 Ω | L1 | 70 mh |
| R7 | 301 Ω | L2 | 210 mh ⎫ wound on |
|  |  |  | ⎬ single |
| R8 | 15 KΩ | L3 | 210 mh ⎭ core |
| R9 | 42.2 KΩ | Lamps 18 and 19 | Type 1785D |
| R10 | 15 KΩ |  |  |
| R11 | 30.1 KΩ |  |  |
| R12 | 49.9 KΩ |  |  |
| R13 | 100 KΩ |  |  |
| R14 | 10 KΩ |  |  |
| R15 | 20 KΩ |  |  |
| R16 | 6.8 KΩ |  |  |
| R17 | 8.2 KΩ |  |  |
| R18 | 240 Ω |  |  |
| R19 | 1 KΩ |  |  |
| R20 | 100 KΩ |  |  |

The above circuit when employed with a telephone subset having an impedance of 600 ohms reduced the effect of the reflected signal by more than 20 db over the band from 200 to 3,500 Hz.

Active hybrid circuits in accordance with the present invention employ amplifiers and a compensating network. A transformer type hybrid together with a signal amplifying arrangement for obtaining similar results requires transformers, relatively large capacitors, and amplifier circuits. Thus, active hybrid circuits as described herein provide considerable savings in size and weight over arrangements previously available.

While there has been shown and described what is considered a preferred embodiment of the present invention, it will be obvious to those skilled in the art that various changes and modifications may be made therein without departing from the invention as defined by the appended claims.

What is claimed is:

1. An active hybrid circuit comprising
an input terminal for receiving input signals;
receiving amplifier means having an input connection coupled to said input terminal and having two output connections for producing therebetween a differential output of the signals applied at the input connection;
two common terminals for connecting a transmitting and receiving unit thereto;
said output connections of the receiving amplifier means being coupled to said common terminals, whereby input signals received at the input terminal and amplified to produce a differential output by the receiving amplifier means are applied to the transmitting and receiving unit;
transmitting amplifier means having two input connections for receiving a differential input and having an output connection;
said input connections of the transmitting amplifier means being coupled to said common terminals, whereby signals being transmitted by the transmitting and receiving unit are applied to the transmitting amplifier means and amplified transmitted signals are produced at the output connection of the transmitting amplifier means; and
compensating means coupled to the input terminal and directly to a first of said two input connections of the transmitting amplifier means;
said compensating means including
first circuit means including impedance means connected between said input terminal and a connection point,
second circuit means including impedance means connected between said connection point and said first input connection of the transmitting amplifier means, and
third circuit means including impedance means connected between said connection point and a point of reference potential;
said compensating means being operable in response to a signal at the input terminal to produce a signal at said first input connection of the transmitting amplifier means causing the transmitting amplifier means to produce at its output connection a signal which is substantially equal and of opposite polarity to the signal produced at its output connection in response to the same input signal amplified by the receiving amplifier means, coupled to the transmitting amplifier means, and amplified by the transmitting amplifier means, whereby substantially none of a signal received at the input terminal appears at the output connection of the transmitting amplifier means.

2. An active hybrid circuit comprising
receiving input signals;
an input terminal for receiving amplifier means having an input connection coupled to said input terminal and having two output connections for producing therebetween a differential output of the signals applied at the input connection;
two common terminals for connecting a transmitting and receiving unit thereto;
said output connections of the receiving amplifier means being coupled to said common terminals, whereby input signals received at the input terminal and amplified to produce a differential output by the receiving amplifier means are applied to the transmitting and receiving unit;
transmitting amplifier means having two input connections for receiving a differential input and having an output connection;
said input connections of the transmitting amplifier means being coupled to said common terminals, whereby signals being transmitted by the transmitting and receiving unit are applied to the transmitting amplifier means and amplified transmitted signals are produced at the output connection of the transmitting amplifier meas; and
compensating means coupled to the input terminal and directly to a first of said two input connections of the transmitting amplifier means, said compensating means being operable in response to a signal at the input terminal to produce a signal at said first input connection means; the transmitting amplifier means causing the transmitting amplifier means to produce at its output connection a signal which is substantially equal and of opposite polarity to the signal produced at its output connection in response to the same input signal amplified by the receiving amplifier means, coupled to the transmitting amplifier means, and amplified by the transmitting amplifier means, whereby substantially none of a signal received at the input terminal appears at the output connection of the transmitting amplifier means;
said receiving amplifier means being a differential amplifier means having a first input connection coupled to said input terminal and a second input connection coupled to a point of reference potential; and
said transmitting amplifier means being an operational amplifier having two input connections, an inverting input connection and a non-inverting input connection, a first of said two input connections being directly connected to said compensating means and the second of said two input connections being connected to said point of reference potential through a resistance.

3. An active hybrid circuit in accordance with claim 2 wherein said compensating means includes
first circuit means including impedance means connected between said input terminal and a connection point,
second circuit means including impedance means connected between said connection point and said first input connection of the transmitting amplifier means, and
third circuit means including impedance means connected between said connection point and said point of reference potential.

4. An active hybrid circuit in accordance with claim 3 including means having capacitive impedance coupling one output connection of the receiving amplifier means to one of said common terminals;

means having capacitive impedance coupling the other output connection of the receiving amplifier means to the other of said common terminals;

means having capacitive impedance coupling the one of said common terminals to the first input connection of the transmitting amplifier means; and means having capacitive impedance coupling the other of said common terminals to the second input connection of the transmitting amplifier means.

5. An active hybrid circuit in accordance with claim 4 wherein said point of reference potential is at ground potential;

said first input connection of said transmitting amplifier means is the inverting input connection; and said second input connection of said transmitting amplifier means is the non-inverting input connection.

* * * * *